(12) United States Patent
Hwang et al.

(10) Patent No.: US 10,690,222 B2
(45) Date of Patent: Jun. 23, 2020

(54) POWER TRANSMISSION APPARATUS FOR A VEHICLE

(71) Applicants: Hyundai Motor Company, Seoul (KR); Kia Motors Corporation, Seoul (KR)

(72) Inventors: Seong Wook Hwang, Gunpo-si (KR); Seongwook Ji, Gunpo-si (KR); Ki Dong Kim, Anyang-si (KR); Wonmin Cho, Hwaseong-si (KR); Hyun Sik Kwon, Seoul (KR); Cheol Ho Jang, Busan (KR); Kijong Park, Hwaseong-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 73 days.

(21) Appl. No.: 16/208,328

(22) Filed: Dec. 3, 2018

(65) Prior Publication Data

US 2020/0063831 A1     Feb. 27, 2020

(30) Foreign Application Priority Data

Aug. 22, 2018   (KR) .......................... 10-2018-0098113

(51) Int. Cl.
*F16H 3/66*      (2006.01)
*F16H 3/46*      (2006.01)
*F16H 3/78*      (2006.01)

(52) U.S. Cl.
CPC ................. *F16H 3/46* (2013.01); *F16H 3/78* (2013.01); *F16H 2200/0021* (2013.01);
(Continued)

(58) Field of Classification Search
CPC ........ F16H 3/46; F16H 3/006; F16H 37/0833; F16H 3/093
See application file for complete search history.

(56) References Cited

U.S. PATENT DOCUMENTS 8,323,142 B2 * 12/2012 Masumoto .............. F16H 3/006
                                                      475/218
9,920,824 B1 * 3/2018 Hwang .................. F16H 37/042
(Continued)

FOREIGN PATENT DOCUMENTS

JP           4168873 B2    8/2008

*Primary Examiner* — Derek D Knight
(74) *Attorney, Agent, or Firm* — Morgan, Lewis & Bockius LLP (57) ABSTRACT

A power transmission apparatus for a vehicle may include a first input shaft selectively connectable to an engine output shaft, a second input shaft coaxial and selectively connectable to the first input shaft, a torque mediating shaft coaxial with the first input shaft, a first intermediate shaft in parallel with the first input shaft, a compound shifting section including a first planetary gear set having a sun gear fixed to the torque mediating shaft, a planet carrier fixed to the second input shaft, and a ring gear and a second planetary gear set having a sun gear fixedly to the first intermediate shaft, a ring gear selectively connectable to a transmission housing, and a planet carrier for outputting a torque, and a fixed shifting section receiving a torque from the compound shifting section and outputting a modified torque to the second sun gear of the compound shifting section.

12 Claims, 6 Drawing Sheets

(52) U.S. Cl.
CPC ............... *F16H 2200/0039* (2013.01); *F16H 2200/0047* (2013.01); *F16H 2200/0073* (2013.01); *F16H 2200/2007* (2013.01); *F16H 2200/2038* (2013.01); *F16H 2200/2041* (2013.01); *F16H 2200/2051* (2013.01)

(56) References Cited

U.S. PATENT DOCUMENTS

| | | | |
|---|---|---|---|
| 10,549,623 B1 * | 2/2020 | Park | B60K 6/40 |
| 10,569,636 B1 * | 2/2020 | Park | F16H 3/006 |
| 2018/0154757 A1 * | 6/2018 | Lee | B60K 6/547 |

* cited by examiner

| Shift-stage | CL1 | CL2 | B1 |
|---|---|---|---|
| D1 | ● |  | ● |
| D2 |  | ● | ● |
| D3 | ● | ● |  |

| Shift-stage | CL1 | CL2 | B1 | SL1 | | |
|---|---|---|---|---|---|---|
| | | | | DG2 | N | DG1 |
| D1 | ● | | ● | | | ● |
| D2 | ● | | ● | ● | | |
| D3 | | ● | ● | ○ | ● | ○ |
| D4 | ● | ● | | ● | | |
| D5 | ● | ● | | | | ● |

○ : Preliminary engagement available

| Shift-stage | CL1 | CL2 | CL3 | B1 | B2 | SL1 | | | SL2 | | | SL3 | |
|---|---|---|---|---|---|---|---|---|---|---|---|---|---|
| | | | | | | DG2 | N | DG1 | DG3 | N | DG5 | N | DG4 |
| REV | ● | | | ● | | ○ | ● | ○ | | ● | ● | ● | |
| D1 | | | ● | ● | | ● | ● | | ○ | ● | ○ | ● | ○ |
| D2 | ● | | | ● | | ○ | ● | ○ | | ● | ○ | ● | ● |
| D3 | | | ● | ● | | | ● | ● | ○ | ● | ○ | ● | ○ |
| D4 | ● | | | ● | | ○ | ● | ○ | ● | ● | | ● | |
| D5 | | ● | | ● | | ○ | ● | ○ | ○ | ● | ○ | ● | ○ |
| D6 | | ● | | ● | | ○ | ● | ○ | ● | ● | | ● | |
| D7 | ● | ● | ● | | | | ● | ● | ○ | ● | ○ | ● | ○ |
| D8 | | ● | ● | | | ○ | ● | ○ | | ● | | ● | ● |
| D9 | ● | ● | | | | ● | ● | | ○ | ● | ○ | ● | ○ |
| D10 | | ● | | | ● | ○ | ● | ○ | | ● | ○ | ● | ○ |
| D11 | ● | ● | | | | ○ | ● | ○ | | ● | ● | ● | |

○ : Preliminary engagement available

POWER TRANSMISSION APPARATUS FOR A VEHICLE

CROSS-REFERENCE TO RELATED APPLICATION

The present application claims priority to Korean Patent Application No. 10-2018-0098113 filed on Aug. 22, 2018, the entire contents of which is incorporated herein for all purposes by this reference.

BACKGROUND OF THE INVENTION

Field of the Invention

The present invention relates to a power transmission apparatus configured for a vehicle.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such future vehicle technology.

The double clutch transmission (DCT) may include two clutches devices and a gear train of a basically manual transmission, selectively transmits a torque input from an engine to two input shafts by use of the two clutches devices, and outputs a torque shifted by the gear train.

Such a double clutch transmission (DCT) attempts to compactly realize a multi-stage transmission of more than five speeds. The DCT achieves an automated manual transmission (AMT) that removes the inconvenience of a manual shifting of a driver, by controlling two clutches and synchronizers by a controller.

In comparison with an automatic transmission using planetary gears, such a DCT shows merits, such as higher efficiency in power delivery, easier modification in revising or adding parts to achieve more shifting stages, etc., and thus gathers more spotlight since it can more comfortably conform to fuel consumption regulation and efficiency in achieving more shifting stages.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus configured for a vehicle having advantages achieving shifting stages of at least three forward speeds by employing a simple arrangement of two planetary gear sets and external gear engagements to a double clutch scheme, improving fuel consumption and better applicability to a hybrid vehicle.

A power transmission apparatus configured for a vehicle may include a first input shaft, a second input shaft, a torque mediating shaft, a first intermediate shaft, a compound shifting section, a fixed shifting section, and an output shaft. The first input shaft may be selectively connectable to an engine output shaft for receiving an input torque through a first clutch. The second input shaft may be formed as a hollow shaft, disposed coaxial with and external to the first input shaft without rotational interference, and selectively connectable to the engine output shaft through a second clutch. The torque mediating shaft may be disposed coaxial with and external to the first input shaft without rotational interference. The first intermediate shaft may be disposed in parallel with the first input shaft. The compound shifting section may include a first planetary gear set and a second planetary gear set, the first planetary gear set being disposed on the first input shaft and having a first sun gear fixedly connected to the torque mediating shaft, a first planet carrier fixedly connected to the second input shaft, and a first ring gear integrally formed with an intermediate output gear, the second planetary gear set being disposed on the first intermediate shaft and having a second sun gear fixedly connected to the first intermediate shaft, a second ring gear selectively connectable to a transmission housing through a first brake, and a second planet carrier for outputting a torque. The fixed shifting section may receive a torque from the compound shifting section through the first input shaft and the torque mediating shaft and output a modified torque to the second sun gear of the compound shifting section. The output shaft may be disposed in parallel with the first input shaft and on a same axis of the first intermediate shaft, and output a torque received from the first ring gear and the second planet carrier of the compound shifting section to a differential.

The output shaft may be fixedly connected to the second planet carrier of the compound shifting section, and may be formed with an output shaft input gear externally gear-meshed with an intermediate output gear integrally formed on an external circumference of the first ring gear.

The first and second planetary gear sets may be respectively a single pinion planetary gear set.

The fixed shifting section may include a first drive gear fixedly connected to the first input shaft and the torque mediating shaft, and a first driven gear fixedly connected to the first intermediate shaft and externally gear-meshed with the first drive gear.

The fixed shifting section may include a first drive gear fixedly connected to the torque mediating shaft, a first driven gear fixedly connected to the first intermediate shaft and externally gear-meshed with the first drive gear, a second drive gear rotatably disposed on the first input shaft, a second driven gear fixedly connected to the first intermediate shaft and externally gear-meshed with the second drive gear, and a first synchronizer selectively connecting the first drive gear and the second drive gear to the first input shaft.

A gear ratio between the first drive gear and the first driven gear may be used for realizing the first forward speed and the fifth forward speed. A gear ratio between the second drive gear and the second driven gear may be used for realizing the second forward speed and the fourth forward speed.

The fixed shifting section may include a third input shaft, a second intermediate shaft, a first drive gear, a first driven gear, a second drive gear, a second driven gear, a first synchronizer, a third drive gear, a first intermediate drive gear, a second synchronizer, a fourth drive gear, a fifth drive gear, and a third synchronizer. The third input shaft may be formed as a hollow shaft, coaxially disposed between the first and second input shafts without rotational interference, and selectively connectable to input shaft through a third clutch. The second intermediate shaft may be disposed in parallel with the first input shaft. The first drive gear may be fixedly connected to the torque mediating shaft. The first driven gear may be fixedly connected to the first intermediate shaft and externally gear-meshed with the first drive gear. The second drive gear may be rotatably disposed on the third input shaft. The second driven gear may be fixedly connected to the first intermediate shaft and externally gear-meshed with the second drive gear. The first synchronizer may be selectively connecting the first drive gear and the second drive gear to the third input shaft. The third drive gear may be rotatably disposed on the first intermediate shaft. The first intermediate drive gear may be fixedly connected to the first input shaft and externally gear-meshed with the third drive gear. The second synchronizer may be selectively connecting the third drive gear to the first intermediate shaft. The fourth drive gear may be rotatably disposed on the second intermediate shaft and externally gear-meshed with the first drive gear. The fifth drive gear may be rotatably disposed on the second intermediate shaft and externally gear-meshed with the second driven gear. The third synchronizer may selectively connect the fourth drive gear and the fifth drive gear to the second intermediate shaft.

The second intermediate shaft may be integrally formed with a second intermediate driven gear externally gear-meshed with a second intermediate drive gear fixed to the first input shaft.

The torque mediating shaft may be selectively connectable to the transmission housing through the second brake.

A gear ratio between the first drive gear and the first driven gear may be used for realizing the third forward speed and the seventh forward speed. A gear ratio between the second drive gear and the second driven gear may be used for realizing the first forward speed and the ninth forward speed. A gear ratio between the third drive gear and the first intermediate drive gear may be used for realizing the fourth forward speed and the sixth forward speed. A gear ratio between the fourth drive gear and the first driven gear may be used for realizing the second forward speed and the eighth forward speed. A gear ratio between the fifth drive gear and the second driven gear may be used for realizing the eleventh forward speed and the reverse speed.

A power transmission apparatus configured for a vehicle according to an exemplary embodiment of the present invention realizes at least three forward speeds by employing two planetary gear sets to a multiple clutch transmission, facilitating multiple shifting stages by a simplified arrangement, improving installability, and reducing an overall weight.

In addition, by alternately operating two clutches between odd-numbered and even-numbered shifting stages, shifting may become smoother.

Furthermore, effects that may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
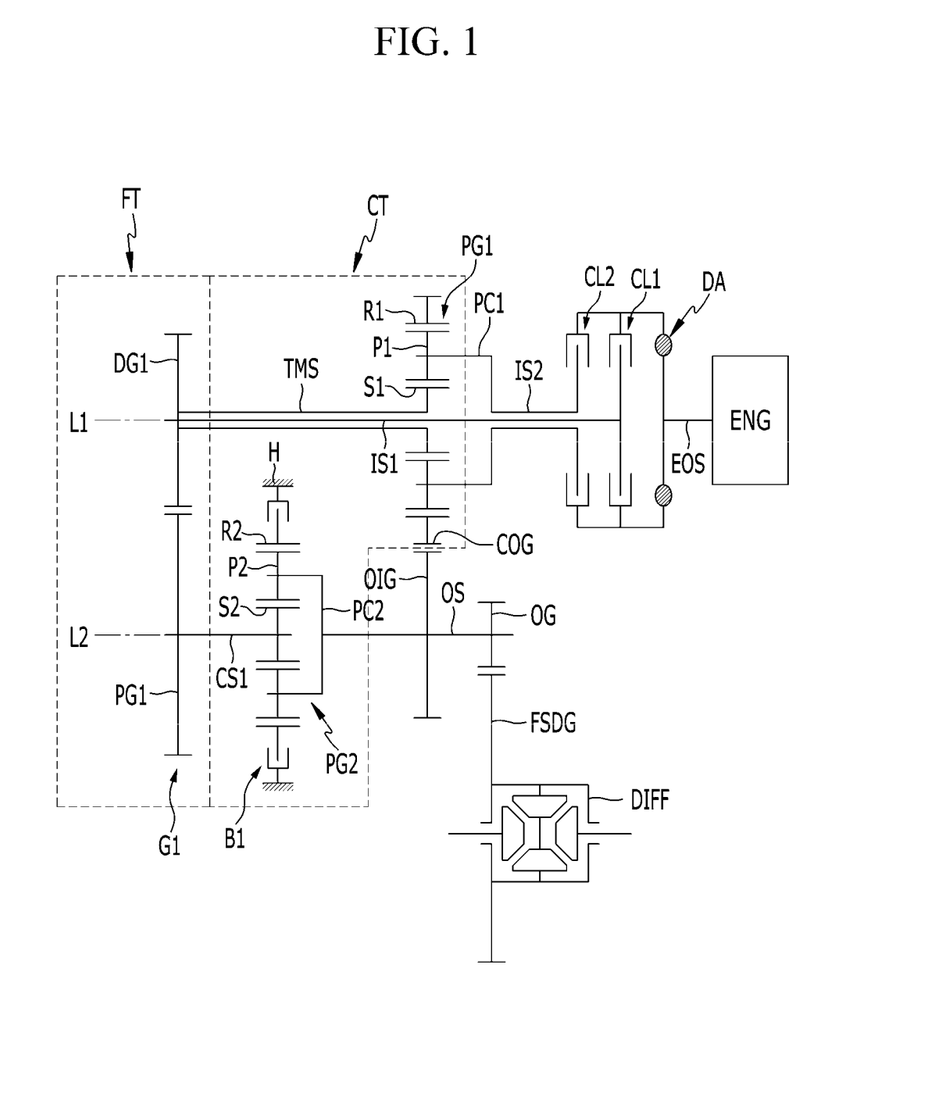
FIG. 1 is a schematic view of a power transmission apparatus configured for a vehicle according to various exemplary embodiments of the present invention.

FIG. 1 is a schematic view of a power transmission apparatus configured for a vehicle according to various exemplary embodiments of the present invention.

Referring to FIG. 1, a power transmission apparatus configured for a vehicle according to various exemplary embodiments of the present invention, and includes first and second input shafts IS1 and IS2, a torque mediating shaft TMS, a first intermediate shaft CS1, a compound shifting section CT, a fixed shifting section FT, and an output shaft OS.

According to a power transmission apparatus configured for a vehicle according to various exemplary embodiments of the present invention, the torque of the engine as a power source is shifted to three forward speeds by cooperative operation of the compound shifting section CT and the fixed shifting section FT, and the shifted torque is output through the output shaft OS.

The engine ENG is a primary power source and a variety of typical engines such as a gasoline engine or a diesel engine that uses fossil fuel may be used as the engine ENG.

The torque from the engine ENG is transmitted to the fixed shifting section FT and the compound shifting section CT through the first and second input shafts IS1 and IS2.

The fixed shifting section FT and the compound shifting section CT are disposed over the first and second axes L1 and L2 disposed in parallel. The first and second input shafts IS1 and IS2 and torque mediating shaft TMS are disposed on the first axis L1. The first intermediate shaft CS1 and the output shaft OS are disposed on the second axis L2.

The first input shaft IS1 disposed on the first axis L1 is selectively connectable to an engine output shaft EOS (e.g., crankshaft) through the first clutch CL1, and selectively transmits the torque of the engine to the fixed shifting section FT. The engine output shaft EOS may be regarded as an overall input shaft of the power transmission apparatus.

The second input shaft IS2 is formed as a hollow shaft and disposed coaxial with and external to the first input shaft IS1 without rotational interference, and selectively connectable to the engine output shaft EOS through a second clutch CL2, selectively transmitting the torque of the engine ENG to the compound shifting section CT.

The torque mediating shaft TMS is disposed coaxial with and external to the first input shaft IS1 without rotational interference, and interconnects the fixed shifting section FT and the compound shifting section CT.

The first intermediate shaft CS1 and the output shaft OS disposed on the second axis L2 are interconnected through the compound shifting section CT. The output shaft OS is integrally formed with an output shaft input gear OIG and a final output gear OG, and the final output gear OG is externally gear-meshed with a final reduction gear FSDG to be connected to a differential DIFF.

The compound shifting section CT includes a first planetary gear set PG1 disposed on the first input shaft IS1 and a second planetary gear set PG2 disposed on the first intermediate shaft CS1.

The first planetary gear set PG1 is a single pinion planetary gear set, and includes a first sun gear S1, a first planet carrier PC1 rotatably supporting a plurality of first pinions P1 externally gear-meshed with the first sun gear S1, and a first ring gear R1 internally gear-meshed with the first pinions P1.

Retarding the first planetary gear set PG1, the first sun gear S1 is fixedly connected to the torque mediating shaft TMS, and the first planet carrier PC1 is fixedly connected to the second input shaft IS2. In addition, an intermediate output gear COG is integrally formed on an external circumference of the first ring gear R1.

The first planetary gear set PG1 receives the torque of the engine at the first planet carrier PC1 through the second input shaft IS2, and outputs a shifted intermediate torque to the fixed shifting section FT or the output shaft OS.

The first ring gear R1 is an output element, and the intermediate output gear COG integrally formed on the external circumference of the first ring gear R1 is externally gear-meshed with the output shaft input gear OIG on the output shaft OS.

The second planetary gear set PG2 is a single pinion planetary gear set, and includes a second sun gear S2, a second planet carrier PC2 rotatably supporting a plurality of second pinions P2 externally gear-meshed with the second sun gear S2, and a second ring gear R2 internally gear-meshed with the second pinions P2.

The second planetary gear set PG2 is disposed on the first intermediate shaft CS1. The second sun gear S2 is fixedly connected to the first intermediate shaft CS1. The second planet carrier PC2 is fixedly connected to output shaft OS. The second ring gear R2 is selectively connectable to the transmission housing H through the first brake B1.

Receives a torque at the second sun gear S2 from the first intermediate shaft CS1, the second planetary gear set PG2 forms an adjusted torque of a decreased rotation speed, and outputs the adjusted torque to the output shaft OS through the second planet carrier PC2.

The first and second planetary gear sets PG1 and PG2 in the compound shifting section CT are disposed between the engine ENG and the fixed shifting section FT.

The engagement elements of the first clutch and second clutch CL1 and CL2, and the first brake B1 may be realized as multi-plate hydraulic pressure friction devices that are frictionally engaged by hydraulic pressure, however, it may not be understood to be limited thereto, since various other configuration that are electrically controllable may be available.

The fixed shifting section FT includes a first shifting gear set G1 formed between the first input shaft IS1 (or equivalently, the torque mediating shaft TMS) and the first intermediate shaft CS1.

The first shifting gear set G1 includes a first drive gear DG1 and a first driven gear PG1. The first drive gear DG1 is integrally formed with the first input shaft IS1 and the torque mediating shaft TMS, The first driven gear PG1 is integrally formed with the first intermediate shaft CS1, and externally gear-meshed with the first drive gear DG1.

The fixed shifting section FT may achieve a shifting in a fixed shift-ratio by the first shifting gear set G1.

The gear ratio between the first drive gear DG1 and the first driven gear PG1 may be set in consideration of design factors. In the various exemplary embodiments of the present invention, the gear ratio of the first shifting gear set G1 is used as a gear ratio for the first forward speed.

That is, the first forward speed is realized by the first shifting gear set G1.

The torque shifted by the fixed shifting section FT through the shifting gear set G1 is output to the compound shifting section CT through a single path.

In a state that a torque is not input to the compound shifting section CT from the fixed shifting section FT, when the first brake B1 is operated while the torque of the engine ENG is input to the planet carrier PC by the operation of the second clutch CL2, the first and second planetary gear sets PG1 and PG2, the first shifting gear set G1, and the first intermediate shaft CS1 form a closed power delivery path. As such, a shifting operation may be realized by cooperative operation of the fixed shifting section FT and the compound shifting section CT forming a shift-ratio by combination of the gear ratio of the first shifting gear set G1 and the gear ratio between the output shaft input gear OIG and the intermediate output gear COG.

The reference symbol DA indicates a damper employed to absorb a torque variation of the engine ENG.

Figure 2:
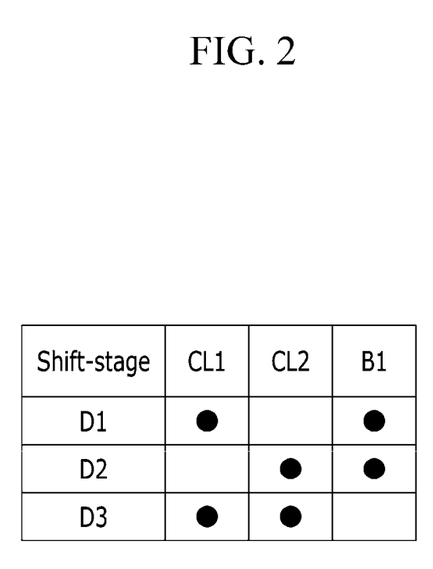
FIG. 2 is a shifting operation chart of a power transmission apparatus configured for a vehicle according to various exemplary embodiments of the present invention.

FIG. 2 is a shifting operation chart of a power transmission apparatus configured for a vehicle according to various exemplary embodiments of the present invention, and the power transmission apparatus configured for a vehicle according to various exemplary embodiments performs shifting operation as follows.

[The First Forward Speed]

In the first forward speed D1, as shown in FIG. 2, the first clutch CL1 and the first brake B1 are operated.

By the operation of the first clutch CL1, the torque of the engine ENG is input to the second sun gear S2 of the second planetary gear set PG2 through the first clutch CL1, the first input shaft IS1, the first drive gear DG1, the first driven gear PG1, the first intermediate shaft CS1. In this state, by the operation of the first brake B1, the second planetary gear set PG2 outputs a decreased speed through the output shaft OS and the final output gear OG, realizing the first forward speed and outputting a shifted torque to the final reduction gear FSDG and the differential DIFF.

In the instant case, the first planetary gear set PG1 does not affect shifting for the first speed.

[The Second Forward Speed]

In the second forward speed D2, as shown in FIG. 2, the second clutch CL2 and the first brake B1 are operated.

By the operation of the second clutch CL2, the torque of the engine ENG is input to the first planet carrier PC1 of the first planetary gear set PG1. In this state, by the operation of the first brake B1, the second ring gear R2 of the second planetary gear set PG2 is fixed to the transmission housing H.

As a result, the first and second planetary gear sets PG1 and PG2, the first shifting gear set G1, the first intermediate shaft CS1, the output shaft OS, and the output shaft input gear OIG form a closed power delivery path. As such, a shifting operation may be realized by cooperative operation of the fixed shifting section FT and the compound shifting section CT forming a shift-ratio by combination of the gear ratio of the first shifting gear set G1 and the gear ratio between the output shaft input gear OIG and the intermediate output gear COG, realizing the second forward speed and outputting a shifted torque to the final reduction gear FSDG and the differential DIFF through the output shaft OS and the final output gear OG.

[The Third Forward Speed]

In the third forward speed D3, as shown in FIG. 2, the first clutch CL1 and the second clutch CL2 are operated.

By the operation of the first clutch CL1, the torque of the engine ENG is partially input to the second sun gear S2 of the second planetary gear set PG2 through the first clutch CL1, the first input shaft IS1, the first drive gear DG1, the first driven gear PG1, and the first intermediate shaft CS1. By the operation of the second clutch CL2, the torque of the engine ENG is partially input to the first planet carrier PC1 of the first planetary gear set PG1.

Since the first planetary gear set PG1 of the compound shifting section CT receives the same rotation speed, the first planetary gear set PG integrally rotates and outputs an input torque as inputted through the first ring gear R, the intermediate output gear COG, and the output shaft input gear OIG, realizing the third forward speed and outputting a shifted torque to the final reduction gear FSDG and the differential DIFF through the output shaft OS and the final output gear OG.

Figure 3:
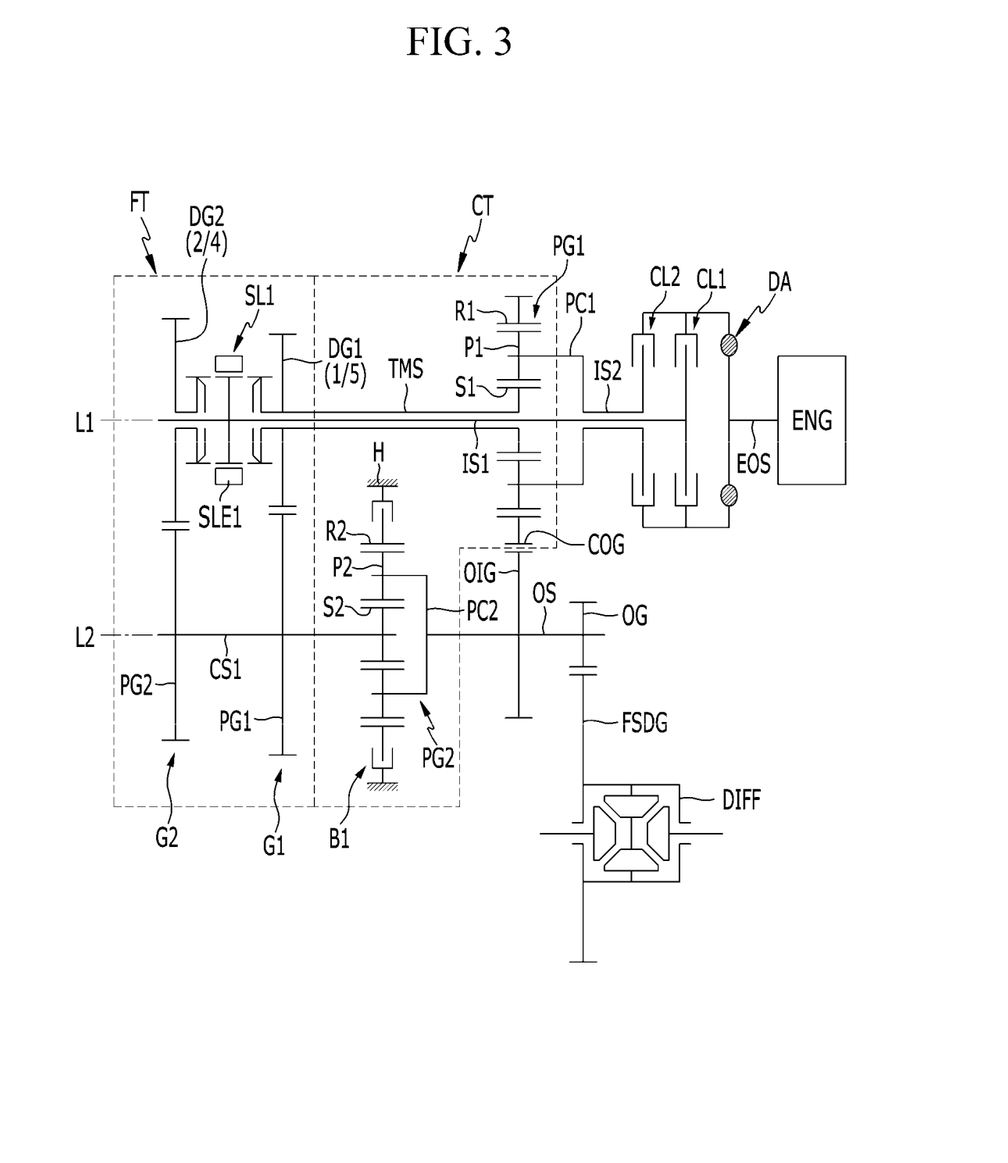
FIG. 3 is a schematic view of a power transmission apparatus configured for a vehicle according to various exemplary embodiments of the present invention.

FIG. 3 is a schematic diagram of a power transmission apparatus configured for a vehicle according to various exemplary embodiments of the present invention.

As shown in FIG. 3, according to the various exemplary embodiments in comparison with the various exemplary embodiments of the present invention, the fixed shifting section FT may include first and second shifting gear sets G1 and G2 and a synchronizer SL1, five forward speeds are achieved.

In comparison with the various exemplary embodiments of the present invention of FIG. 1, the fixed shifting section FT further employs the shifting gear set G2 and the synchronizer SL1. The synchronizer SL1 selectively connects the first input shaft IS1 to the first and second shifting gear sets G1 and G2, and the fixed shifting section FT forms two intermediate stages.

The first shifting gear set G1 includes a first drive gear DG1 and a first driven gear PG1. The first drive gear DG1 is integrally formed with the torque mediating shaft TMS that is disposed coaxial with and external to the first input shaft IS1. The first driven gear PG1 is integrally formed with the first intermediate shaft CS1, and externally gear-meshed with the first drive gear DG1.

The second shifting gear set G2 includes a second drive gear DG2 and a second driven gear PG2. The second drive gear DG2 is rotatably disposed on an external circumference of the first input shaft IS1. The second driven gear PG2 is integrally formed with the first intermediate shaft CS1, and externally gear-meshed with the second drive gear DG2.

The first synchronizer SL1 is disposed on the first input shaft IS1 between the first drive gear DG1 or the second drive gear DG2, and selectively connects the first drive gear DG1 and the second drive gear DG2 to the first input shaft IS1.

The first synchronizer SN1 may be formed as a known scheme, and the first sleeve SLE1 applied to the first synchronizer SN1 may be operated by respective actuators that may be controlled by a transmission control unit.

Gear ratios of the first and second shifting gear sets G1 and G2 and any pair of externally gear-meshed gear set may be set according to design factors such as engine and vehicle specifications. The gear ratio of the first shifting gear set G1 is used for realizing the first forward speed and the fifth forward speed. The gear ratio of the second shifting gear set G2 is used for realizing the second forward speed and the fourth forward speed.

Figure 4:
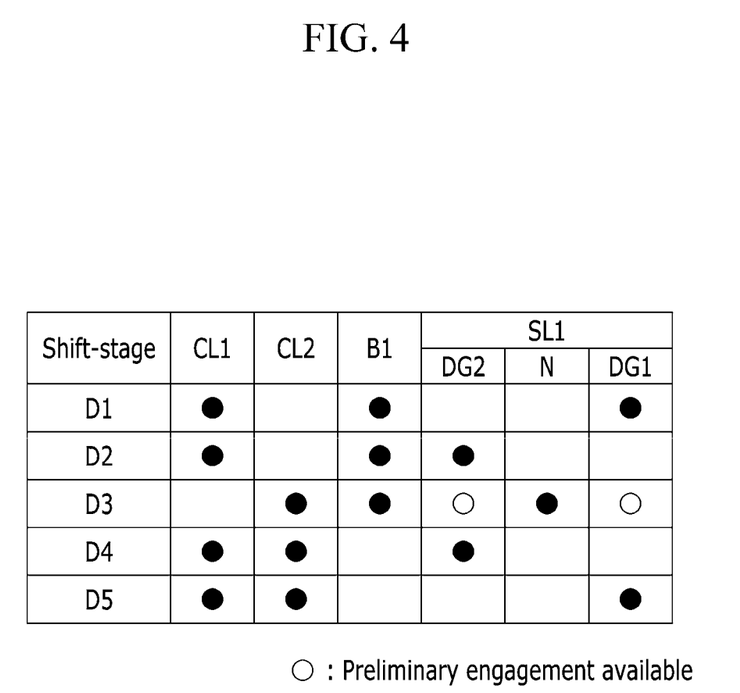
FIG. 4 is a shifting operation chart of a power transmission apparatus configured for a vehicle according to various exemplary embodiments of the present invention.

FIG. 4 is a shifting operation chart of a power transmission apparatus configured for a vehicle according to various exemplary embodiments of the present invention, and the power transmission apparatus configured for a vehicle according to various exemplary embodiments performs shifting operation as follows.

[The First Forward Speed]

In the first forward speed D1, as shown in FIG. 4, the first drive gear DG1 and the first input shaft IS1 are synchronously interconnected by the operation of the sleeve SEL1 of the first synchronizer SL1, and the first clutch CL1 and the first brake B1 are operated.

By the operation of the first clutch CL1, the torque of the engine ENG is transmitted through the first clutch CL1, the first input shaft IS1, the first drive gear DG1, the first driven gear PG1, the first intermediate shaft CS1, and the second sun gear S2 of the second planetary gear set PG2. In this state, by the operation of the first brake B1, the second planetary gear set PG2 outputs a decreased speed through the output shaft OS and the final output gear OG, realizing the first forward speed and outputting a shifted torque to the final reduction gear FSDG and the differential DIFF.

In the instant case, the first planetary gear set PG1 does not affect shifting for the first speed.

[The Second Forward Speed]

In the second forward speed D2, as shown in FIG. 4, the second drive gear DG2 and the first input shaft IS1 are synchronously interconnected by the operation of the sleeve SEL1 of the first synchronizer SL1, and the first clutch CL1 and the first brake B1 are operated.

By the operation of the first clutch CL1, the torque of the engine ENG is transmitted through the first clutch CL1, the first input shaft IS1, the second drive gear DG2, the second driven gear PG2, the first intermediate shaft CS1, and the second sun gear S2 of the second planetary gear set PG2. In this state, by the operation of the first brake B1, the second planetary gear set PG2 outputs a decreased speed through the output shaft OS and the final output gear OG, realizing the second forward speed and outputting a shifted torque to the final reduction gear FSDG and the differential DIFF.

In the instant case, the first planetary gear set PG1 does not affect shifting for the first speed.

[The Third Forward Speed]

In the third forward speed D3, as shown in FIG. 4, the first synchronizer SL1 is maintained neutral, and the second clutch CL2 and the first brake B1 are operated.

By the operation of the second clutch CL2, the torque of the engine ENG is input to the first planet carrier PC1 of the first planetary gear set PG1. In this state, by the operation of the first brake B1, the second ring gear R2 of the second planetary gear set PG2 is fixed to the transmission housing H.

As a result, the first and second planetary gear sets PG1 and PG2, the first shifting gear set G1, the first intermediate shaft CS1, the output shaft OS, and the output shaft input gear OIG form a closed power delivery path. As such, a shifting operation may be realized by cooperative operation of the fixed shifting section FT and the compound shifting section CT forming a shift-ratio by combination of the gear ratio of the first shifting gear set G1 and the gear ratio between the output shaft input gear OIG and the intermediate output gear COG, realizing the third forward speed and outputting a shifted torque to the final reduction gear FSDG and the differential DIFF through the output shaft OS and the final output gear OG.

[The Fourth Forward Speed]

In the fourth forward speed D4, as shown in FIG. 4, the second drive gear DG2 and the first input shaft IS1 are synchronously interconnected by the operation of the sleeve SEL1 of the first synchronizer SL1, and the first clutch CL1 and the second clutch CL2 are operated.

As a result, by the operation of the first clutch CL1, the torque of the engine ENG is partially input to the first sun gear S1 of the first planetary gear set PG1 through the first clutch CL1, the first input shaft IS1, the second drive gear DG2, the second driven gear PG2, the first intermediate shaft CS1, the first driven gear PG1, the first drive gear DG1, and the torque mediating shaft TMS. By the operation of the second clutch CL2, the torque of the engine ENG is partially input to the first planet carrier PC1 of the first planetary gear set PG1.

As such, according to different rotation speeds of the first sun gear S1 and the first planet carrier PC1, the first planetary gear set PG1 of the compound shifting section CT forms an adjusted torque of another rotation speed at the first ring gear R1, and outputs the adjusted torque through the intermediate output gear COG and the output shaft input gear OIG, realizing the fourth forward speed and outputting a shifted torque to the final reduction gear FSDG and the differential DIFF through the output shaft OS and the final output gear OG.

[The Fifth Forward Speed]

In the fifth forward speed D5, as shown in FIG. 4, the first drive gear DG1 and the first input shaft IS1 are synchronously interconnected by the operation of the sleeve SEL1 of the first synchronizer SL1, and the first clutch CL1 and the second clutch CL2 are operated.

By the operation of the first clutch CL1, the torque of the engine ENG is partially input to the first sun gear S1 of the first planetary gear set PG1 through the first clutch CL1, the first input shaft IS1, the first drive gear DG1, and the torque mediating shaft TMS. By the operation of the second clutch CL2, the torque of the engine ENG is partially input to the first planet carrier PC1 of the first planetary gear set PG1.

Since the first planetary gear set PG1 of the compound shifting section CT receives the same rotation speed, the first planetary gear set PG integrally rotates and outputs an input torque as inputted through the first ring gear R, the intermediate output gear COG, and the output shaft input gear OIG, realizing the fifth forward speed and outputting a shifted torque to the final reduction gear FSDG and the differential DIFF through the output shaft OS and the final output gear OG.

Figure 5:
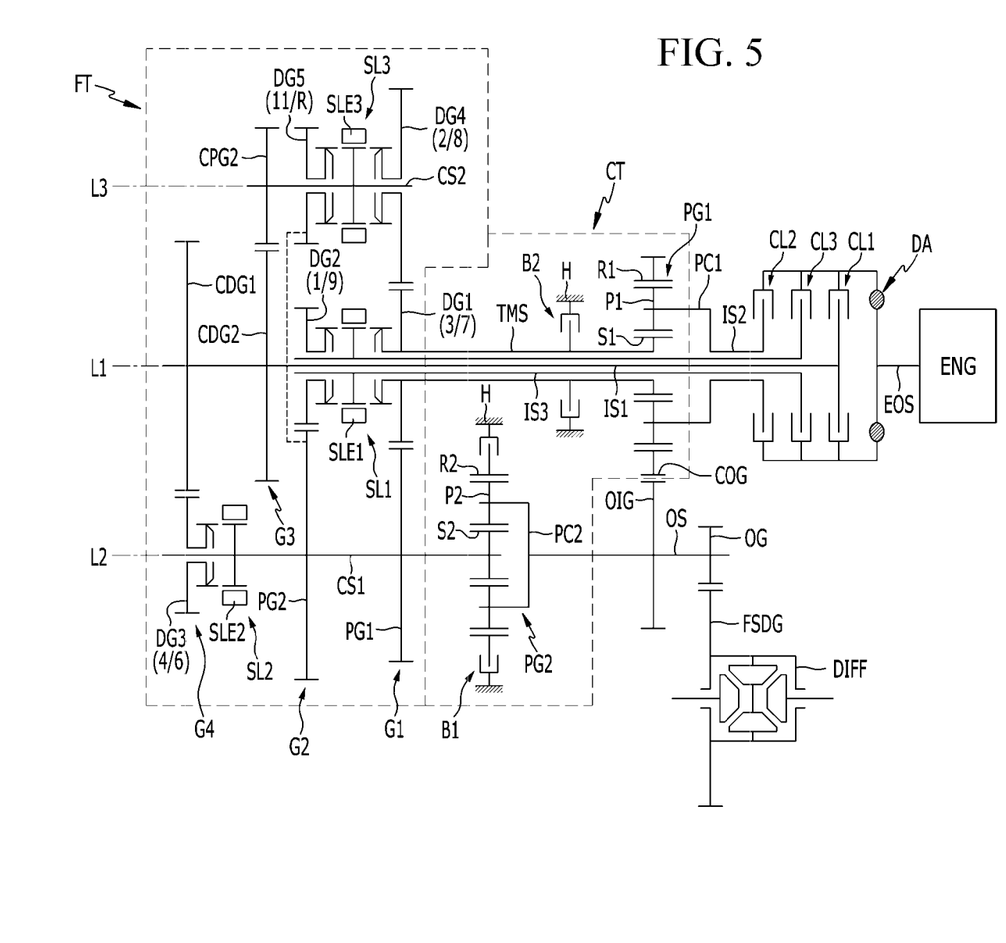
FIG. 5 is a schematic view of a power transmission apparatus configured for a vehicle according to various exemplary embodiments of the present invention.

FIG. 5 is a schematic diagram of a power transmission apparatus configured for a vehicle according to various exemplary embodiments of the present invention.

As shown in FIG. 5 in comparison with the various exemplary embodiments of the present invention of FIG. 3, a power transmission apparatus according to various exemplary embodiments may further include a third input shaft IS3, a second intermediate shaft CS2, and a second brake B2.

The third input shaft IS3 is disposed coaxial with the first input shaft IS1 along the first axis L1, and selectively connectable to the engine output shaft EOS through a third clutch CL3. The second intermediate shaft CS2 is disposed along a third axis L3 that is in parallel with the first axis L1, such that the second intermediate shaft CS2 is disposed in parallel with the first input shaft IS1. The torque mediating shaft TMS of the compound shifting section CT is fixedly connected to the first sun gear S1 of the first planetary gear set PG1 as in the various exemplary embodiments. The torque mediating shaft TMS is selectively connectable to the transmission housing H through the second brake B2, such that the first sun gear S1 selectively acts as a fixed element.

In addition, according to the various exemplary embodiments in comparison with the various exemplary embodiments of the present invention, the fixed shifting section FT includes first, second, third, and fourth shifting gear sets G1, G2, G3, and G4 and first, second, and third synchronizers SL1, SL2, and SL3. The first, second, third, and fourth shifting gear sets G1, G2, G3, and G4 are disposed on the first and third input shafts IS1 and IS3 and the first and second intermediate shafts CS1 and CS2. By such an arrangement, a power transmission apparatus according to various exemplary embodiments realizes eleven forward speeds and one reverse speed.

The first shifting gear set G1 includes a first drive gear DG1, a first driven gear PG1, and a fourth drive gear DG4. The first drive gear DG1 is integrally formed with the torque mediating shaft TMS disposed coaxial with and external to the third input shaft IS3. The first driven gear PG1 is integrally formed with the first intermediate shaft CS1 and externally gear-meshed with the first drive gear DG1. The fourth drive gear DG4 is rotatably disposed on an external circumference of the second intermediate shaft CS2 without rotational interference, and externally gear-meshed with the first drive gear DG1.

The second shifting gear set G2 includes a second drive gear DG2, a second driven gear PG2, and a fifth drive gear DG5. The second drive gear DG2 is rotatably disposed on an external circumference of the third input shaft IS3 without rotational interference. The second driven gear PG2 is integrally formed with the first intermediate shaft CS1, and externally gear-meshed with the second drive gear DG2. The fifth drive gear DG5 is rotatably disposed on an external circumference of the second intermediate shaft CS2 without rotational interference, and externally gear-meshed with the second driven gear PG2.

The third shifting gear set G3 includes a second intermediate drive gear CDG2 and a second intermediate driven gear CPG2. The second intermediate drive gear CDG2 is integrally formed with the first input shaft IS1. The second intermediate driven gear CPG2 is integrally formed with the second intermediate shaft CS2, and externally gear-meshed with the second intermediate drive gear COG2.

The fourth shifting gear set G4 includes a first intermediate drive gear CDG1

The first intermediate drive gear CDG1 is integrally formed with the first input shaft IS2. The third drive gear DG3 is rotatably disposed on an external circumference of the first intermediate shaft CS1, and externally gear-meshed with the first intermediate drive gear COG1.

The first synchronizer SL1 is disposed on the third input shaft IS3 between the first drive gear DG1 and the second drive gear DG2, and selectively connects the first drive gear DG1 and the second drive gear DG2 to the third input shaft IS3.

The second synchronizer SL2 is disposed on the first intermediate shaft CS1, and selectively connects the third drive gear DG3 to the first intermediate shaft CS1.

The third synchronizer SL3 is disposed between the fourth drive gear DG4 and the fifth drive gear DG5, and selectively connects the fourth drive gear DG4 or the fifth drive gear DG5 to the second intermediate shaft CS2.

By including the four shifting gear sets G1, G2, G3, and G4, the fixed shifting section FT forms four intermediate stages. Gear ratios of the four shifting gear set G1, G2, G3, and G4 and any pair of externally gear-meshed gear set may be set according to design factors such as engine and vehicle specifications. The gear ratio of the first shifting gear set G1 is used for realizing the second forward speed, the third forward speed, the seventh forward speed, and the eighth forward speed. The gear ratio of the second shifting gear set G2 is used for realizing the first forward speed, the ninth forward speed, the eleventh forward speed, and the reverse speed. The gear ratio of the fourth shifting gear set G4 is used for realizing the fourth forward speed and the sixth forward speed.

It may be understood that gear ratios of the first, second, and fourth and shifting gear sets G1, G2, and G4 may act independently. However, the gear ratio of the third shifting gear set G3 only acts when a torque transmitted to the second intermediate shaft CS2 is transmitted to the fourth or fifth drive gear DG4 or DG5 of the first or second shifting gear set G1 or G2 by the operation of the third synchronizer SL3.

By the above described arrangement, the fixed shifting section FT forms an intermediately torque modified by the first to fourth shifting gear sets G1, G2, G3, and G4 and transmits the modified torque to the compound shifting section CT through two paths, i.e., one through the first intermediate shaft CS1 and the other through the first shifting gear set G1 and the torque mediating shaft TMS.

The first, second, and third synchronizers SN1, SN2, and SN3 may be formed as a known scheme, and first, second, and third sleeves SLE1, SLE2, and SLE3 applied to the first, second, and third synchronizers SN1, SN2, and SN3 may be operated by respective actuators that may be controlled by a transmission control unit.

Figure 6:
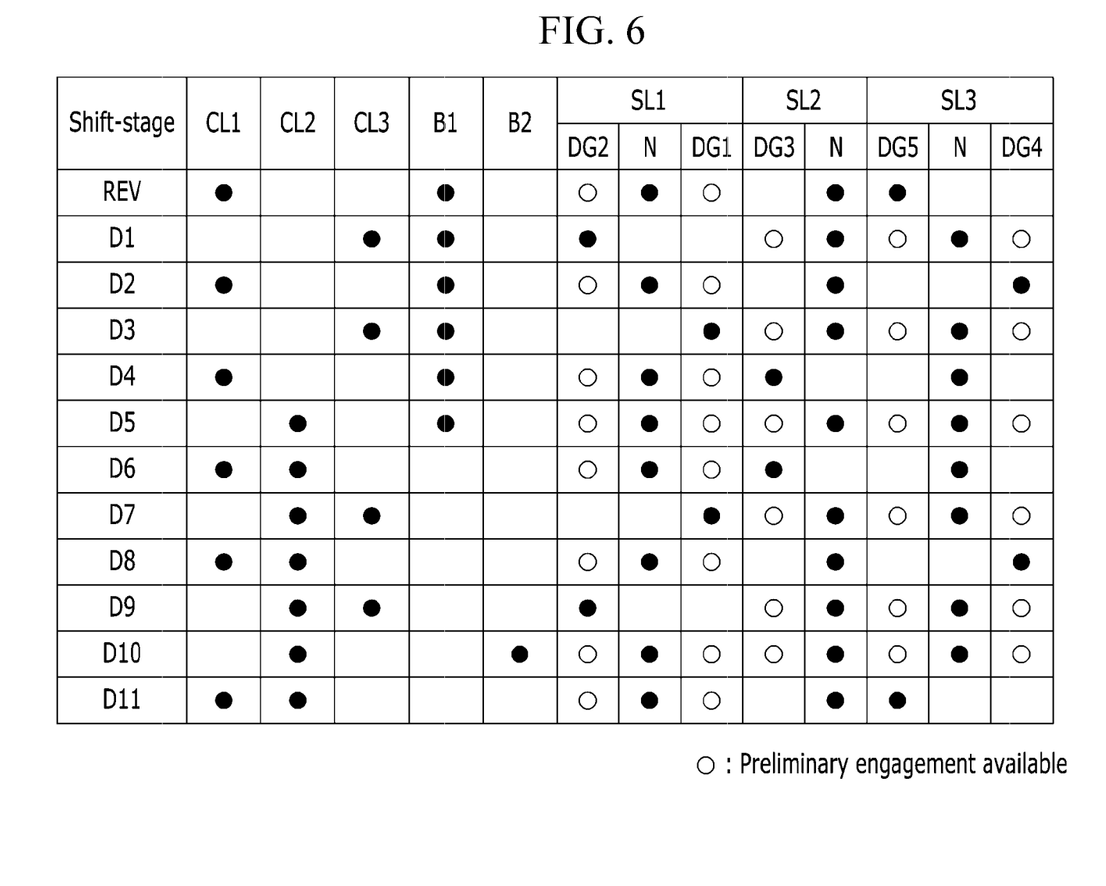
FIG. 6 is a shifting operation chart of a power transmission apparatus configured for a vehicle according to various exemplary embodiments of the present invention.

FIG. 6 is a shifting operation chart of a power transmission apparatus configured for a vehicle according to various exemplary embodiments of the present invention, and the power transmission apparatus configured for a vehicle according to various exemplary embodiments performs shifting operation as follows.

[The Reverse Speed]

In the reverse speed REV, as shown in FIG. 6, the fifth drive gear DG2 and the second intermediate shaft CS2 are synchronously interconnected by the operation of the sleeve SEL3 of the third synchronizer SL3, and the first clutch CL1 and the first brake B1 are operated.

As a result, by the operation of the first clutch CL1, the torque of the engine ENG is input to the second sun gear S2 of the second planetary gear set PG2 through the first clutch CL1, the first input shaft IS1, the second intermediate drive gear CDG2, the second intermediate driven gear CPG2, the second intermediate shaft CS2, the fifth drive gear DG5, the second driven gear PG2, and the first intermediate shaft CS1.

By the operation of the first brake B1, the second ring gear R2 of the second planetary gear set PG2 acts as a fixed element by being fixed to the transmission housing H. Therefore, the second planetary gear set PG2 forms a decreased speed of the torque received through the second sun gear S2 and outputs the torque of the decreased speed to the output shaft OS and the final output gear OG through the second planet carrier PC2, forming the reverse speed and outputting a shifted torque to the final reduction gear FSDG and the differential DIFF.

In the instant case, the first planetary gear set PG1 does not affect shifting for the reverse speed.

[The First Forward Speed]

In the first forward speed D1, as shown in FIG. 6, the second drive gear DG2 and the third input shaft IS3 are synchronously interconnected by the operation of the sleeve SEL1 of the first synchronizer SL1, and the third clutch CL3 and the first brake B1 are operated.

As a result, by the operation of the third clutch CL3, the torque of the engine ENG is input to the second sun gear S2 of the second planetary gear set PG2 through the third clutch CL3, the third input shaft IS3, the second drive gear DG2, the second driven gear PG2, and the first intermediate shaft CS1.

By the operation of the first brake B1, the second ring gear R2 of the second planetary gear set PG2 acts as a fixed element by being fixed to the transmission housing H. Therefore, the second planetary gear set PG2 forms a decreased speed of the torque received through the second sun gear S2 and outputs the torque of the decreased speed to the output shaft OS and the final output gear OG through the second planet carrier PC2, realizing the first forward speed and outputting a shifted torque to the final reduction gear FSDG and the differential DIFF.

In the instant case, the first planetary gear set PG1 does not affect shifting for the first forward speed.

[The Second Forward Speed]

In the second forward speed D2, as shown in FIG. 6, the fourth drive gear DG4 and the second intermediate shaft CS2 are synchronously interconnected by the operation of the sleeve SEL3 of the third synchronizer SL3, and the first clutch CL1 and the first brake B1 are operated.

As a result, by the operation of the first clutch CL1, the torque of the engine ENG is input to the second sun gear S2 of the second planetary gear set PG2 through the first clutch CL1, the first input shaft IS1, the second intermediate drive gear CDG2, the second intermediate driven gear CPG2, the second intermediate shaft CS2, the fifth drive gear DG5, the first drive gear DG1, the first driven gear PG1, and the first intermediate shaft CS1.

By the operation of the first brake B1, the second ring gear R2 of the second planetary gear set PG2 acts as a fixed element by being fixed to the transmission housing H. Therefore, the second planetary gear set PG2 forms a decreased speed of the torque received through the second sun gear S2 and outputs the torque of the decreased speed to the output shaft OS and the final output gear OG through the second planet carrier PC2, realizing the second forward speed and outputting a shifted torque to the final reduction gear FSDG and the differential DIFF.

In the instant case, the first planetary gear set PG1 does not affect shifting for the second forward speed.

[The Third Forward Speed]

In the third forward speed D3, as shown in FIG. 6, the first drive gear DG1 and the third input shaft IS3 are synchronously interconnected by the operation of the sleeve SEL1 of the first synchronizer SL1, and the third clutch CL3 and the first brake B1 are operated.

As a result, by the operation of the third clutch CL3, the torque of the engine ENG is input to the second sun gear S2 of the second planetary gear set PG2 through the third clutch CL3, the third input shaft IS3, the first drive gear DG1, the first driven gear PG1, and the first intermediate shaft CS1.

By the operation of the first brake B1, the second ring gear R2 of the second planetary gear set PG2 acts as a fixed element by being fixed to the transmission housing H. Therefore, the second planetary gear set PG2 forms a decreased speed of the torque received through the second sun gear S2 and outputs the torque of the decreased speed to the output shaft OS and the final output gear OG through the second planet carrier PC2, realizing the third forward speed and outputting a shifted torque to the final reduction gear FSDG and the differential DIFF.

In the instant case, the first planetary gear set PG1 does not affect shifting for the third forward speed.

[The Fourth Forward Speed]

In the fourth forward speed D4, as shown in FIG. 6, the third drive gear DG3 and the first intermediate shaft CS1 are synchronously interconnected by the operation of the sleeve SEL2 of the second synchronizer SL2, and the first clutch CL1 and the first brake B1 are operated.

As a result, by the operation of the first clutch CL1, the torque of the engine ENG is input to the second sun gear S2 of the second planetary gear set PG2 through the first clutch CL1, the first input shaft IS1, the first intermediate drive gear CDG1, the third drive gear DG3, and the first intermediate shaft CS1.

By the operation of the first brake B1, the second ring gear R2 of the second planetary gear set PG2 acts as a fixed element by being fixed to the transmission housing H. Therefore, the second planetary gear set PG2 forms a decreased speed of the torque received through the second sun gear S2 and outputs the torque of the decreased speed to the output shaft OS and the final output gear OG through the second planet carrier PC2, realizing the fourth forward speed and outputting a shifted torque to the final reduction gear FSDG and the differential DIFF.

In the instant case, the first planetary gear set PG1 does not affect shifting for the fourth forward speed.

[The Fifth Forward Speed]

In the fifth forward speed D5, as shown in FIG. 6, the sleeves SLE1, SEL2, and SL3 of the first, second, and third synchronizers SL1, SL2, and SL3 are maintained neutral, and the second clutch CL2 and the first brake B1 are operated.

As a result, by the operation of the second clutch CL2, the torque of the engine ENG is input to the first planet carrier PC1 of the first planetary gear set PG1 through the second clutch CL2 and the second input shaft IS2. In this state, by the operation of the first brake B1, the second ring gear R2 of the second planetary gear set PG2 is fixed to the transmission housing H.

As a result, the first and second planetary gear sets PG1 and PG2, the torque mediating shaft TMS, the first shifting gear set G1, the first intermediate shaft CS1, the output shaft OS, and the output shaft input gear OIG form a closed power delivery path. As such, a shifting operation may be realized by cooperative operation of the fixed shifting section FT and the compound shifting section CT forming a shift-ratio by combination of the gear ratio of the first shifting gear set G1 and the gear ratio between the output shaft input gear OIG and the intermediate output gear COG, realizing the fifth forward speed and outputting a shifted torque to the final reduction gear FSDG and the differential DIFF through the output shaft OS and the final output gear OG.

[The Sixth Forward Speed]

In the sixth forward speed D6, as shown in FIG. 6, the third drive gear DG3 and the first intermediate shaft CS1 are synchronously interconnected by the operation of the sleeve SEL2 of the second synchronizer SL2, and the first clutch and second clutch CL1 and CL2 is operated.

By the operation of the first clutch CL1, the torque of the engine ENG is partially input to the second sun gear S2 of the second planetary gear set PG2 through the first clutch CL1, the first input shaft IS1, the first intermediate drive gear CDG1, the third drive gear DG3, and the first intermediate shaft CS1. By the operation of the second clutch CL2, the torque of the engine ENG is partially input to the first planet carrier PC1 of the first planetary gear set PG1 through the second clutch CL2 and the second input shaft IS2.

As such, in the compound shifting section CT, the first planet carrier PC1 of the first planetary gear set PG1 and the second sun gear S2 of the second planetary gear set PG2 simultaneously receives the torque of the engine ENG. In this state, the first and second planetary gear sets PG1 and PG2, the torque mediating shaft TMS, the first and fourth shifting gear sets G1 and G4, the first intermediate shaft CS1, the output shaft OS, and the output shaft input gear OIG form a closed power delivery path. As such, a shifting operation may be realized by cooperative operation of the fixed shifting section FT and the compound shifting section CT forming a shift-ratio by combination of the gear ratios of the first and fourth shifting gear sets G1 and G4 and the gear ratio between the output shaft input gear OIG and the intermediate output gear COG, realizing the sixth forward speed and outputting a shifted torque to the final reduction gear FSDG and the differential DIFF through the output shaft OS and the final output gear OG.

[The Seventh Forward Speed]

In the seventh forward speed D7, as shown in FIG. 6, the first drive gear DG1 and the third input shaft IS3 are synchronously interconnected by the operation of the sleeve SEL1 of the first synchronizer SL1, and the second and third clutches CL2 and CL3 are operated.

As a result, by the operation of the second clutch CL2, the torque of the engine ENG is partially input to the first planet carrier PC1 of the first planetary gear set PG1 through the second clutch CL2 and the second input shaft IS2. By the operation of the third clutch CL3, the torque of the engine ENG is partially input to the second sun gear S2 of the second planetary gear set PG2 through the third clutch CL3, the third input shaft IS3, the first drive gear DG1, the first driven gear PG1, and the first intermediate shaft CS1.

As such, in the compound shifting section CT, the first planet carrier PC1 of the first planetary gear set PG1 and the second sun gear S2 of the second planetary gear set PG2 simultaneously receives the torque of the engine ENG. In this state, the first and second planetary gear sets PG1 and PG2, the third input shaft IS3, the first and second shifting gear sets G1 and G2, the torque mediating shaft TMS, the first intermediate shaft CS1, the output shaft OS, and the output shaft input gear OIG form a closed power delivery path. As such, a shifting operation may be realized by cooperative operation of the fixed shifting section FT and the compound shifting section CT forming a shift-ratio by combination of the gear ratios of the first and second shifting gear sets G1 and G2 and the gear ratio between the output shaft input gear OIG and the intermediate output gear COG, realizing the seventh forward speed and outputting a shifted torque to the final reduction gear FSDG and the differential DIFF through the output shaft OS and the final output gear OG.

[The Eighth Forward Speed]

In the eighth forward speed D8, as shown in FIG. 6, the fourth drive gear DG4 and the second intermediate shaft CS2 are synchronously interconnected by the operation of the sleeve SEL3 of the third synchronizer SL3, and the first clutch and second clutch CL1 and CL2 is operated.

By the operation of the first clutch CL1, the torque of the engine ENG is partially input to the second sun gear S2 of the second planetary gear set PG2 through the first clutch CL1, the first input shaft IS1, the second intermediate drive gear CDG2, the second intermediate driven gear CPG2, the second intermediate shaft CS2, the fourth drive gear DG4, the first drive gear DG1, the first driven gear PG1, and the first intermediate shaft CS1. By the operation of the second clutch CL2, the torque of the engine ENG is partially input to the first planet carrier PC1 of the first planetary gear set PG1 through the second clutch CL2 and the second input shaft IS2.

As such, in the compound shifting section CT, the first planet carrier PC1 of the first planetary gear set PG1 and the second sun gear S2 of the second planetary gear set PG2 simultaneously receives the torque of the engine ENG. In this state, the first and second planetary gear sets PG1 and PG2, the first and third shifting gear sets G1 and G3, the first and second intermediate shafts CS1 and CS2, the torque mediating shaft TMS, the output shaft OS, and the output shaft input gear OIG form a closed power delivery path. As such, a shifting operation may be realized by cooperative operation of the fixed shifting section FT and the compound shifting section CT forming a shift-ratio by combination of the gear ratios of the first and third shifting gear sets G1 and G3 and the gear ratio between the output shaft input gear OIG and the intermediate output gear COG, realizing the eighth forward speed and outputting a shifted torque to the final reduction gear FSDG and the differential DIFF through the output shaft OS and the final output gear OG.

[The Ninth Forward Speed]

In the ninth forward speed D9, as shown in FIG. 6, the second drive gear DG2 and the third input shaft IS3 are synchronously interconnected by the operation of the sleeve SEL1 of the first synchronizer SL1, and the second and third clutches CL2 and CL3 are operated.

As a result, by the operation of the second clutch CL2, the torque of the engine ENG is partially input to the first planet carrier PC1 of the first planetary gear set PG1 through the second clutch CL2 and the second input shaft IS2. By the operation of the third clutch CL3, the torque of the engine ENG is partially input to the second sun gear S2 of the second planetary gear set PG2 through the third clutch CL3, the third input shaft IS3, the second drive gear DG2, the second driven gear PG2, and the first intermediate shaft CS1.

As such, in the compound shifting section CT, the first planet carrier PC1 of the first planetary gear set PG1 and the second sun gear S2 of the second planetary gear set PG2 simultaneously receives the torque of the engine ENG. In this state, the first and second planetary gear sets PG1 and PG2, the third input shaft IS3, the first and second shifting gear sets G1 and G2, the torque mediating shaft TMS, the first intermediate shaft CS1, the output shaft OS, and the output shaft input gear OIG form a closed power delivery path. As such, a shifting operation may be realized by cooperative operation of the fixed shifting section FT and the compound shifting section CT forming a shift-ratio by combination of the gear ratios of the first and second shifting gear sets G1 and G2 and the gear ratio between the output shaft input gear OIG and the intermediate output gear COG, realizing the ninth forward speed and outputting a shifted torque to the final reduction gear FSDG and the differential DIFF through the output shaft OS and the final output gear OG.

[The Tenth Forward Speed]

In the tenth forward speed D10, as shown in FIG. 6, the sleeves SLE1, SEL2, and SL3 of the first, second, and third synchronizers SL1, SL2, and SL3 are maintained neutral, and the second clutch CL2 and the second brake B2 are operated.

As a result, by the operation of the second clutch CL2, the torque of the engine ENG is input to the first planet carrier PC1 of the first planetary gear set PG1 through the second clutch CL2 and the second input shaft IS2. In this state, by the operation of the second brake B2, the first sun gear S1 of the first planetary gear set PG1 is fixed to the transmission housing H, and thereby, the first shifting gear set G1 connected to the torque mediating shaft TMS is consequently fixed (stationary).

As a result, the first and second planetary gear sets PG1 and PG2, the torque mediating shaft TMS, the first shifting gear set G1, the first intermediate shaft CS1, the output shaft OS, and the output shaft input gear OIG form a closed power delivery path. As such, a shifting operation may be realized by cooperative operation of the fixed shifting section FT and the compound shifting section CT forming a shift-ratio according to the gear ratio between the output shaft input gear OIG and the intermediate output gear COG, realizing the tenth forward speed and outputting a shifted torque to the final reduction gear FSDG and the differential DIFF through the output shaft OS and the final output gear OG.

[The Eleventh Forward Speed]

In the eleventh forward speed D11, as shown in FIG. 6, the fifth drive gear DG5 and the second intermediate shaft CS2 are synchronously interconnected by the operation of the sleeve SEL3 of the third synchronizer SL3, and the first clutch and second clutch CL1 and CL2 is operated.

By the operation of the first clutch CL1, the torque of the engine ENG is partially input to the second sun gear S2 of the second planetary gear set PG2 through the first clutch CL1, the first input shaft IS1, the second intermediate drive gear CDG2, the second intermediate driven gear CPG2, the second intermediate shaft CS2, the fifth drive gear DG5, the second driven gear PG2, and the first intermediate shaft CS1. By the operation of the second clutch CL2, the torque of the engine ENG is partially input to the first planet carrier PC1 of the first planetary gear set PG1 through the second clutch CL2 and the second input shaft IS2.

As such, in the compound shifting section CT, the first planet carrier PC1 of the first planetary gear set PG1 and the second sun gear S2 of the second planetary gear set PG2 simultaneously receives the torque of the engine ENG. In this state, the first and second planetary gear sets PG1 and PG2, the third input shaft IS3, the torque mediating shaft TMS, the first, second, and third shifting gear sets G1, G2, and G3, the first and second intermediate shafts CS1 and CS2, the output shaft OS, and the output shaft input gear OIG form a closed power delivery path. As such, a shifting operation may be realized by cooperative operation of the fixed shifting section FT and the compound shifting section CT forming a shift-ratio by combination of the gear ratios of the first, second, and third shifting gear sets G1, G2, and G3 and the gear ratio between the output shaft input gear OIG and the intermediate output gear COG, realizing the eleventh forward speed and outputting a shifted torque to the final reduction gear FSDG and the differential DIFF through the output shaft OS and the final output gear OG.

A power transmission apparatus configured for a vehicle according to an exemplary embodiment of the present invention realizes at least three forward speeds by employing two planetary gear sets to a multiple clutch transmission, facilitating multiple shifting stages by a simplified arrangement, improving installability, and reducing an overall weight.

In addition, by alternately operating two clutches between odd-numbered and even-numbered shifting stages, shifting may become smoother.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a vehicle, the power transmission apparatus comprising:
   a first input shaft selectively connectable to an engine output shaft for receiving an input torque through a first clutch;
   a second input shaft formed as a hollow shaft, mounted coaxial with and external to a first portion of the first input shaft without rotational interference with the first input shaft, and selectively connectable to the engine output shaft through a second clutch;
   a torque mediating shaft mounted coaxial with and external to a second portion of the first input shaft without rotational interference with the first input shaft;
   a first intermediate shaft mounted in parallel with the first input shaft;
   a compound shifting section including a first planetary gear set and a second planetary gear set,
      wherein the first planetary gear set is mounted on the first input shaft and has a first sun gear fixedly connected to the torque mediating shaft, a first planet carrier fixedly connected to the second input shaft, and a first ring gear integrally formed with an intermediate output gear, and
      wherein the second planetary gear set is mounted on the first intermediate shaft and has a second sun gear fixedly connected to the first intermediate shaft, a second ring gear selectively connectable to a transmission housing through a first brake, and a second planet carrier for outputting a torque;
   a fixed shifting section engaged with the compound shifting section and receiving a torque from the compound shifting section through the first input shaft and the torque mediating shaft and outputting a modified torque to the second sun gear of the compound shifting section; and
   an output shaft mounted in parallel with the first input shaft and on a same axis of the first intermediate shaft, and outputting a torque received from the first ring gear and the second planet carrier of the compound shifting section to a differential.

2. The power transmission apparatus of claim 1, wherein the output shaft is fixedly connected to the second planet carrier of the compound shifting section, and is formed with an output shaft input gear gear-meshed with the intermediate output gear integrally formed on an external circumference of the first ring gear.

3. The power transmission apparatus of claim 1, wherein the first and second planetary gear sets are respectively a single pinion planetary gear set.

4. The power transmission apparatus of claim 1, wherein the first clutch and the second clutch are connected to the engine output shaft in parallel.

5. The power transmission apparatus of claim 1, wherein the fixed shifting section includes:
   a first drive gear fixedly connected to the first input shaft and the torque mediating shaft; and
   a first driven gear fixedly connected to the first intermediate shaft and gear-meshed with the first drive gear.

6. The power transmission apparatus of claim 1, wherein the fixed shifting section includes:
   a first drive gear fixedly connected to the torque mediating shaft;

a first driven gear fixedly connected to the first intermediate shaft and gear-meshed with the first drive gear;
a second drive gear rotatably mounted on the first input shaft;
a second driven gear fixedly connected to the first intermediate shaft and gear-meshed with the second drive gear; and
a first synchronizer selectively connecting the first drive gear to the first input shaft or the second drive gear to the first input shaft.

7. The power transmission apparatus of claim 6,
wherein a gear ratio between the first drive gear and the first driven gear is used for realizing a first forward speed and a fifth forward speed; and
wherein a gear ratio between the second drive gear and the second driven gear is used for realizing a second forward speed and a fourth forward speed.

8. The power transmission apparatus of claim 1, wherein the fixed shifting section includes:
a third input shaft formed as a hollow shaft, coaxially mounted between the first and second input shafts without rotational interference with the first and second input shafts, and selectively connectable to input shaft through a third clutch;
a second intermediate shaft mounted in parallel with the first input shaft;
a first drive gear fixedly connected to the torque mediating shaft;
a first driven gear fixedly connected to the first intermediate shaft and gear-meshed with the first drive gear;
a second drive gear rotatably mounted on the third input shaft;
a second driven gear fixedly connected to the first intermediate shaft and gear-meshed with the second drive gear;
a first synchronizer selectively connecting the first drive gear to the third input shaft or the second drive gear to the third input shaft;
a third drive gear rotatably mounted on the first intermediate shaft;
a first intermediate drive gear fixedly connected to the first input shaft and gear-meshed with the third drive gear;
a second synchronizer selectively connecting the third drive gear to the first intermediate shaft;
a fourth drive gear rotatably mounted on the second intermediate shaft and gear-meshed with the first drive gear;
a fifth drive gear rotatably mounted on the second intermediate shaft and gear-meshed with the second driven gear; and
a third synchronizer selectively connecting the fourth drive gear to the second intermediate shaft or the fifth drive gear to the second intermediate shaft.

9. The power transmission apparatus of claim 8,
wherein the second intermediate shaft is integrally formed with a second intermediate driven gear gear-meshed with a second intermediate drive gear fixed to the first input shaft.

10. The power transmission apparatus of claim 8,
wherein the torque mediating shaft is selectively connectable to the transmission housing through a second brake.

11. The power transmission apparatus of claim 1,
wherein the first clutch, the second clutch, and the third clutch are connected to the engine output shaft in parallel.

12. The power transmission apparatus of claim 8,
wherein a gear ratio between the first drive gear and the first driven gear is used for realizing a third forward speed and a seventh forward speed;
wherein a gear ratio between the second drive gear and the second driven gear is used for realizing a first forward speed and a ninth forward speed;
wherein a gear ratio between the third drive gear and the first intermediate drive gear is used for realizing a fourth forward speed and a sixth forward speed;
wherein a gear ratio between the fourth drive gear and the first driven gear is used for realizing a second forward speed and an eighth forward speed; and
wherein a gear ratio between the fifth drive gear and the second driven gear is used for realizing an eleventh forward speed and a reverse speed.

* * * * *